June 18, 1957 G. C. HESS ET AL 2,796,602

AIRCRAFT IDENTIFICATION AND LOCATION SYSTEM

Filed Aug. 8, 1947 4 Sheets-Sheet 1

Inventor

RAYMOND M. WILMOTTE
NORMAN H. TAYLOR
GERARD C. HESS

By Samuel J. Snyder Attorney

June 18, 1957 G. C. HESS ET AL 2,796,602

AIRCRAFT IDENTIFICATION AND LOCATION SYSTEM

Filed Aug. 8, 1947 4 Sheets-Sheet 2

Inventor
RAYMOND M. WILMOTTE
NORMAN H TAYLOR
GERARD C. HESS

By Samuel J Snyder

Inventor
RAYMOND M. WILMOTTE
NORMAN H. TAYLOR
GERARD C. HESS
By Samuel J. Snyder

AIRCRAFT IDENTIFICATION AND LOCATION SYSTEM

Filed Aug. 8, 1947 4 Sheets-Sheet 4

Inventor

RAYMOND M. WILMOTTE
NORMAN H. TAYLOR
GERARD C. HESS

By Samuel J. Snyder
Attorney

United States Patent Office 2,796,602
Patented June 18, 1957

2,796,602

AIRCRAFT IDENTIFICATION AND LOCATION SYSTEM

Gerard C. Hess, Asbury Park, N. J., Norman H. Taylor, Manchester, Mass., and Raymond M. Wilmotte, Washington, D. C., assignors, by direct and mesne assignments, to Padevco, Inc., Washington, D. C., a corporation of Delaware Application August 8, 1947, Serial No. 767,490

20 Claims. (Cl. 343—6.5)

This invention relates to a communication system utilizing pulse time position modulation.

The system described in the following specification may be utilized for transmitting information from an airplane to a ground station in response to a received pulse from the ground station, or it may form part of a general communication system. The particular features of our system are the speed with which messages can be sent and the freedom from interference and errors. Another feature is the security or secrecy which can be obtained by virtue of the coded triggering pulses from the ground station, the coded marker pulses, and the very specific receiving equipment required.

In our system each signal character, such as a numerical digit or an alphabetical letter, is represented by an integral number of time units between a set of marker pulses and a signal pulse. At the receiving station the number of time units between the marker and signal pulses is counted and the signal character is reproduced in response to the number of counted time units.

The invention will be more fully understood from the following description and drawings in which.

The system consists of two stations. One may be a ground station and the other an airborne station of the transpondor type. The ground station may include a rotating antenna, as is common in radar and IFF practice. To obtain security against interception both the triggering pulses transmitted by the ground station and the marker pulses transmitted by the transpondor consist of coded groups of pulses. The ground receiver has a number of channels and successive numerals, or letters, or other signal characters, are received in the successive channels. The successive channels are responsive to differently coded groups of pulses. When a number of signal characters are transmitted each has a set of marker pulses coded according to their order in the message and these pulses select the signal channels in the receiver in the same order. Thus the proper order of the signal characters in the receiver is maintained. While the order of the signal characters in the message is maintained by the coding of the marker pulses the signal characters themselves are represented by the time interval between the trailing edge of the second or last marker pulse and a following signal pulse.

Figure 1:
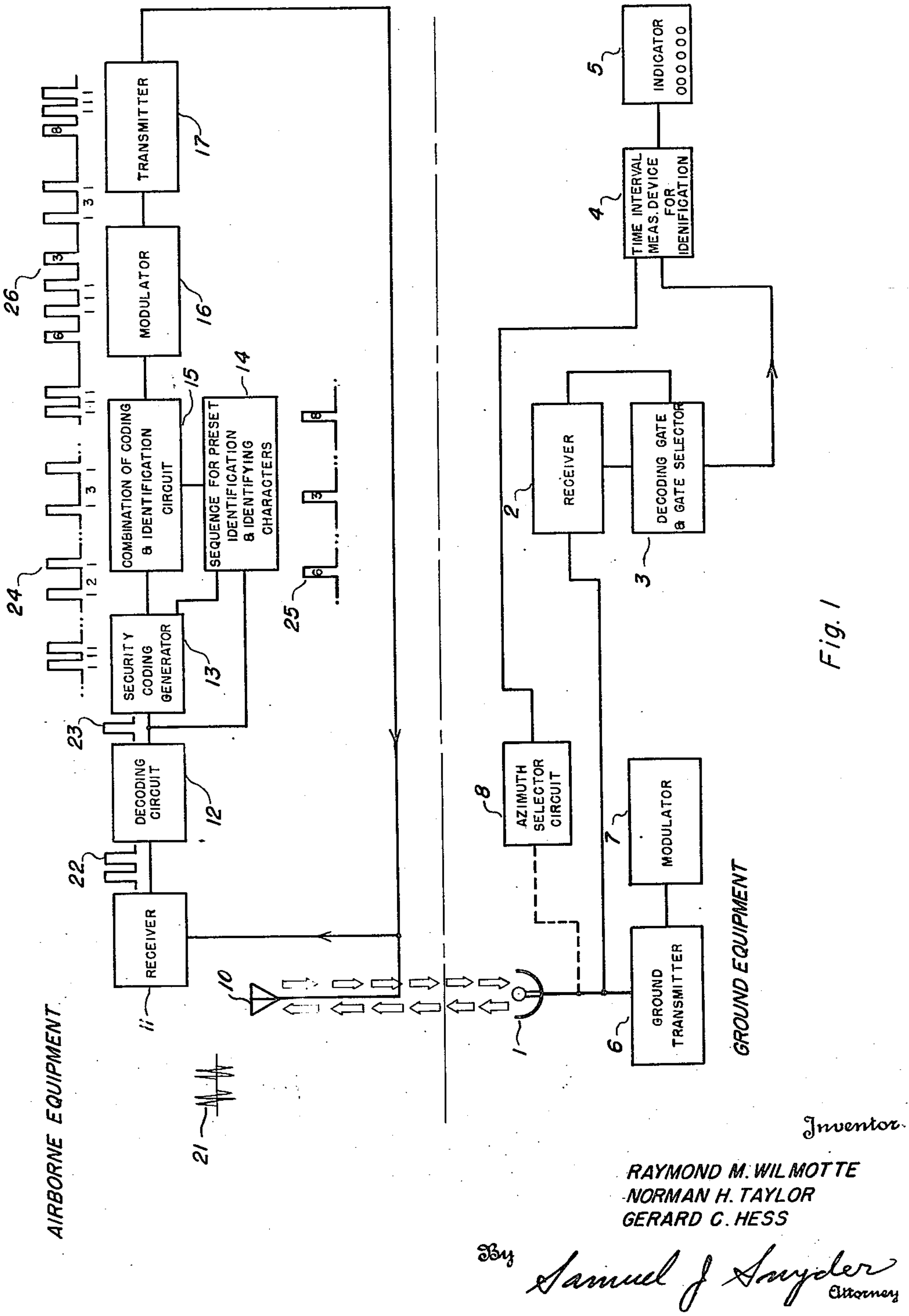
Fig. 1 is a general block diagram of the ground and airborne equipment of a system according to our invention.

Referring to Fig. 1, there is shown a ground station consisting of a rotating interrogating antenna 1 connected to a receiver 2. The output of the receiver 2 is fed to decoding and gate selector circuits 3 and then to a time interval measuring device 4 which operates an indicator 5. In a manner to be fully described hereafter, the indicator 5 reproduces the signal characters in response to the measured time interval between security coded marker pulses and aircraft identification signal pulses. The receiving station is provided with a ground transmitter 6 powered by a modulator 7. The transmitter 6 and modulator 7 are radar units and are preferably arranged to transmit security coded high frequency pulses, as is common for IFF purposes. The pulses transmitted by the antenna 1 are picked up by an antenna 10 and these R. F. pulses 21 are demodulated by a receiver 11 to yield coded video pulses 22. A decoding circuit 12 translates the coded video pulses 22 into a single trigger pulse 23. This single video pulse 23 triggers a security coding marker generator 13 and a generator 14 of signal pulses 25 representing a message, which may be the aircraft identifying characters to be communicated to the ground station. The marker pulses 24 are coded for security purposes, and for the purpose of selecting predetermined receiving channels at the ground station. The marker and signal pulses 25 are combined in circuits 15 and fed to a modulator 16, which pulses a transmitter 17. The output of the transmitter 17 is radiated by the antenna 10 to the ground station.

Figure 4:
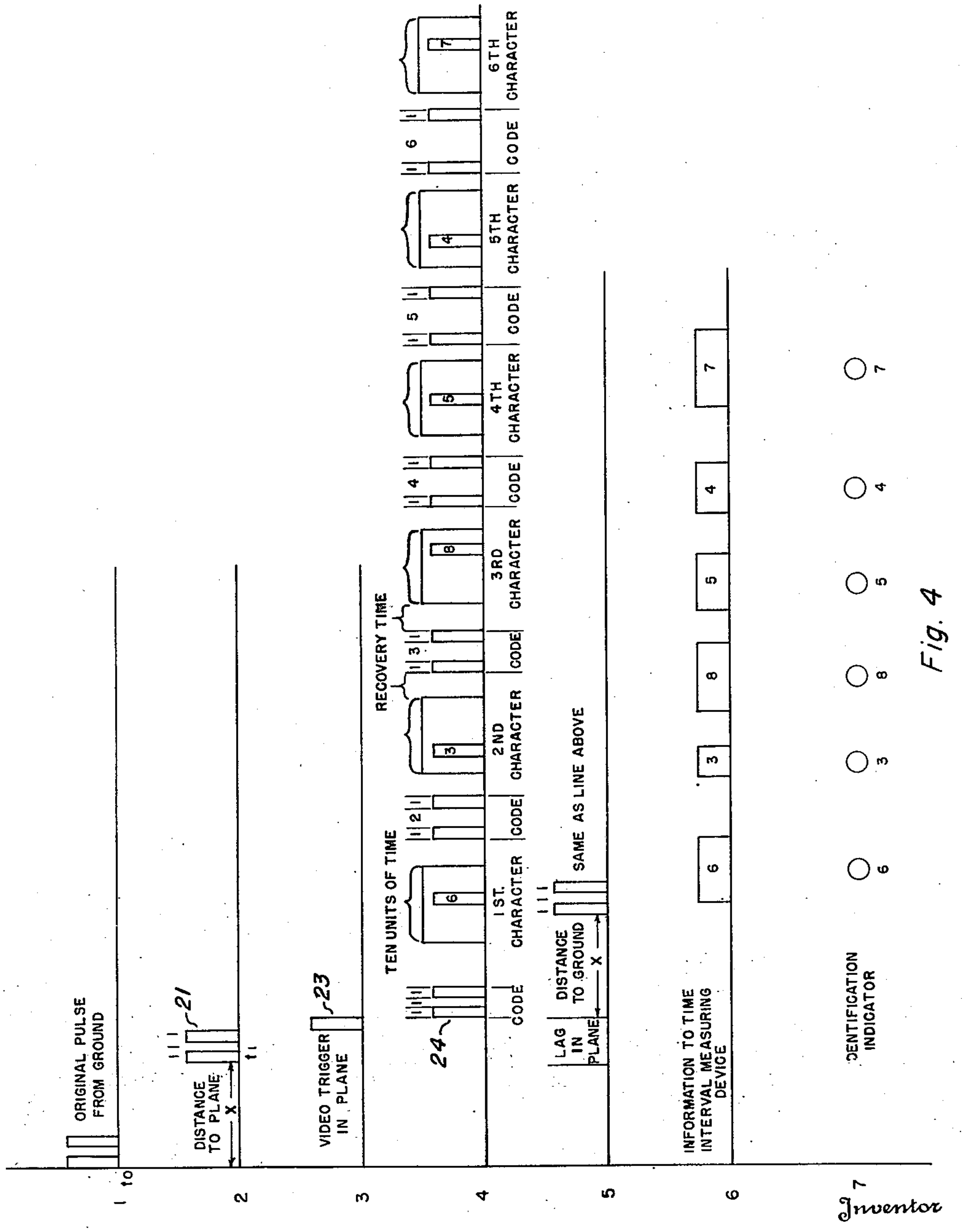
Fig. 4 is a schematic diagram showing the sequence of events in a portion of the system.

In order to make the description of our apparatus more definite, it will be assumed that numbers are to be transmitted. In an aircraft interrogation system, the identifying number of the aircraft may be transmitted. Of course, the signal characters provided for may include the letters of the alphabet and the numerical digits, but if we assume, for simplicity, that only the identification numbers of aircraft are to be sent, the signal characters to be sent are the ten digits. This is done by sending a security marker code 24 (see Fig. 4) which may consist of two pulses, one microsecond wide and spaced one microsecond apart. This is represented by 1—1—1 in Fig. 4. The marker code is followed by a 10 microsecond interval in which is shown a pulse occupying the sixth microsecond of the interval and hence representing the number 6. In Fig. 4 the second marker code is shown as 1—2—1, which represents a one microsecond pulse, a two microsecond space, and another one microsecond pulse. The second signal character is 3 and it therefore occupies the third microsecond of a 10 microsecond interval after the second marker code. Other digits are provided for similarly. It will be understood, of course, that the unit of time may have various lengths other than a microsecond. The output of the transmitting station is therefore a series of pulses such as are shown in the fourth line of Fig. 4 and at 26 in Fig. 1. The position of the signal pulses with respect to the marker pulses will hold circuits in the receiving station open for the time intervals shown in the sixth line of Fig. 4 and consequently cause the indicators at this station to reproduce the numbers shown in the seventh line of Fig. 4. The whole message represented in line 4 of Figure 4 is transmitted in response to a single hit from the ground equipment and is completed before a second hit occurs.

Figure 2:
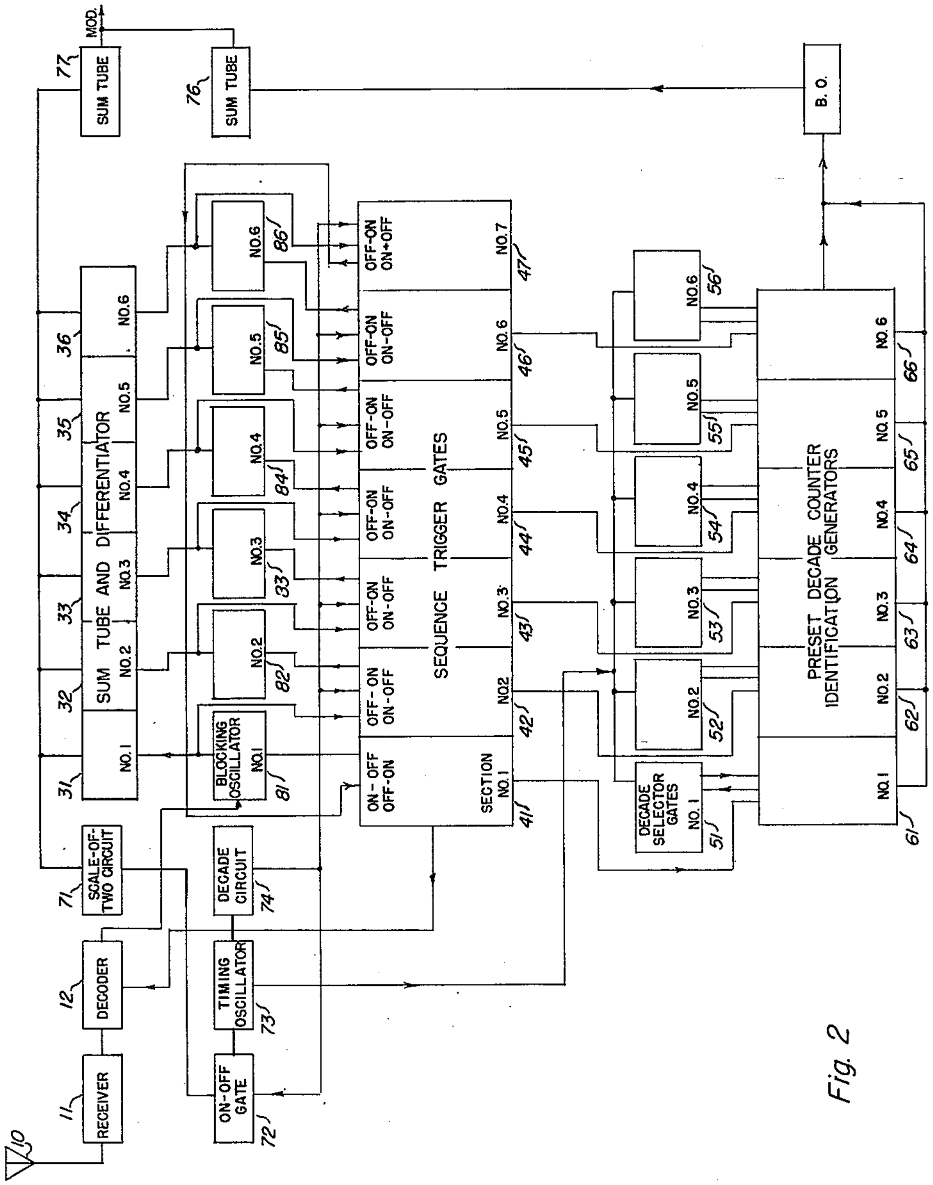
Fig. 2 is a block diagram of a portion of the airborne station according to our invention.

Reference is made to Fig. 2, wherein the airborne station is shown in a detailed block diagram. As previously stated, the high frequency energy from the ground station is picked up by the antenna 10 and is demodulated by the receiver 11 to yield the coded video pulses which are then fed to the decoding circuit 12. The decoding circuit 12 may consist of a delay circuit and a coincidence circuit. These circuits are not shown in detail since they are well known and understood in the art. The delay circuit, for example, could be a delay multi-vibrator or a single shot blocking oscillator provided with a delay artificial line. The coincidence circuit, for example may be a vacuum tube amplifier in which the delayed pulse is applied to the grid while the pulses of the security code are applied to the plate circuit, and the tube circuit is so arranged that the two pulses must be applied simultaneously to produce an effective pulse of current through the amplifier.

The output of the decoder 12 is fed to a blocking oscillator 81. The blocking oscillator 81 may be a single shot oscillator provided with a delay line so that its output may consist, for example, of two one microsecond pulses spaced one microsecond apart. The output of the blocking oscillator is fed through a sum tube 31 and then to a scale-of-two circuit 71. The sum tube may be simply a buffer amplifier and the scale-of-two circuit 7 may be an Eccles-Jordan circuit, which produces a positive pulse corresponding to the trailing edge of the last of the pair of input pulses to the scale-of-two circuit. This positive pulse is used to trigger a gate 72 which turns on a timing oscillator 73. The timing oscillator may have a frequency of one megacycle, the frequency being determined by the counting speed of the decade counters 61—66 and 74.

The blocking oscillator 81 also transmits a pulse to the trigger gate 41 which switches it from On to Off and in so doing turns on the generator 61. This, in turn, opens decade selector gate 51. Generator 61 is a preset decade counter. Gate 51 permits the megacycle output from the oscillator 73 to be fed to the electronic counter 61. The electric counter is set so as to count a predetermined number of half cycles from the timing oscillator 73 and then produce an output pulse, reset itself, and close gate 51. Such presettable counters are known in the art. One preferred type of counter is manufactured by the Radio Corporation of America and is designated RCA type WF–99B. A similar counter is manufactured by the Potter Instrument Company. Presettable decade circuits of any type having an adequate counting speed may be used.

The timing oscillator 73 also feeds its output to a decade counting circuit 74 which produces an output pulse after receiving ten cycles from the timing oscillator 73. This output is fed to the trigger gate 41 to switch it from On to Off. Trigger gate 42 has previously been switched from Off to On by a pulse from blocking oscillator 81. The output pulse of counter 74 also shuts off the On-Off gate 72, which turns off oscillator 73 at the end of each decade.

Switching off of the trigger gate 42 by counter 74 causes a trigger pulse to be sent to blocking oscillator 82. Blocking oscillator 82 is thus triggered and its output turns on trigger gate 43. Blocking oscillator 82 after being triggered, initiates a sequence of operations similar to that previously initiated by blocking oscillator 81. In the same manner, blocking oscillators 83, 84, 85 and 86 produce a sequence of operation resulting in the transmission of a pulse from each of the decade counters 63, 64, 65 and 66. The pulses from the decade counters 61 to 66 trigger a blocking oscillator 75 whose output is fed through a sum tube 76 to the modulator 16 and transmitter 17, shown in Fig. 1. Likewise, the coded marker pulses produced by the blocking oscillators 81 to 86 are fed through the sum tubes 31 to 36 and then to a sum tube 77, which is also connected to the modulator 16. During the entire sequence of operation of the six channels, the trigger gate 41 is in the Off position and blocks the decoder 12 to prevent unwanted pulses from reaching blocking oscillator 81. After the sixth ten microsecond interval the trigger gate 47 transmits a pulse to trigger gate 41 which switches it from Off to On. In the On position trigger gate 41 unblocks decoder 12 and makes it again responsive to properly coded pulses from receiver 11.

Figure 3:
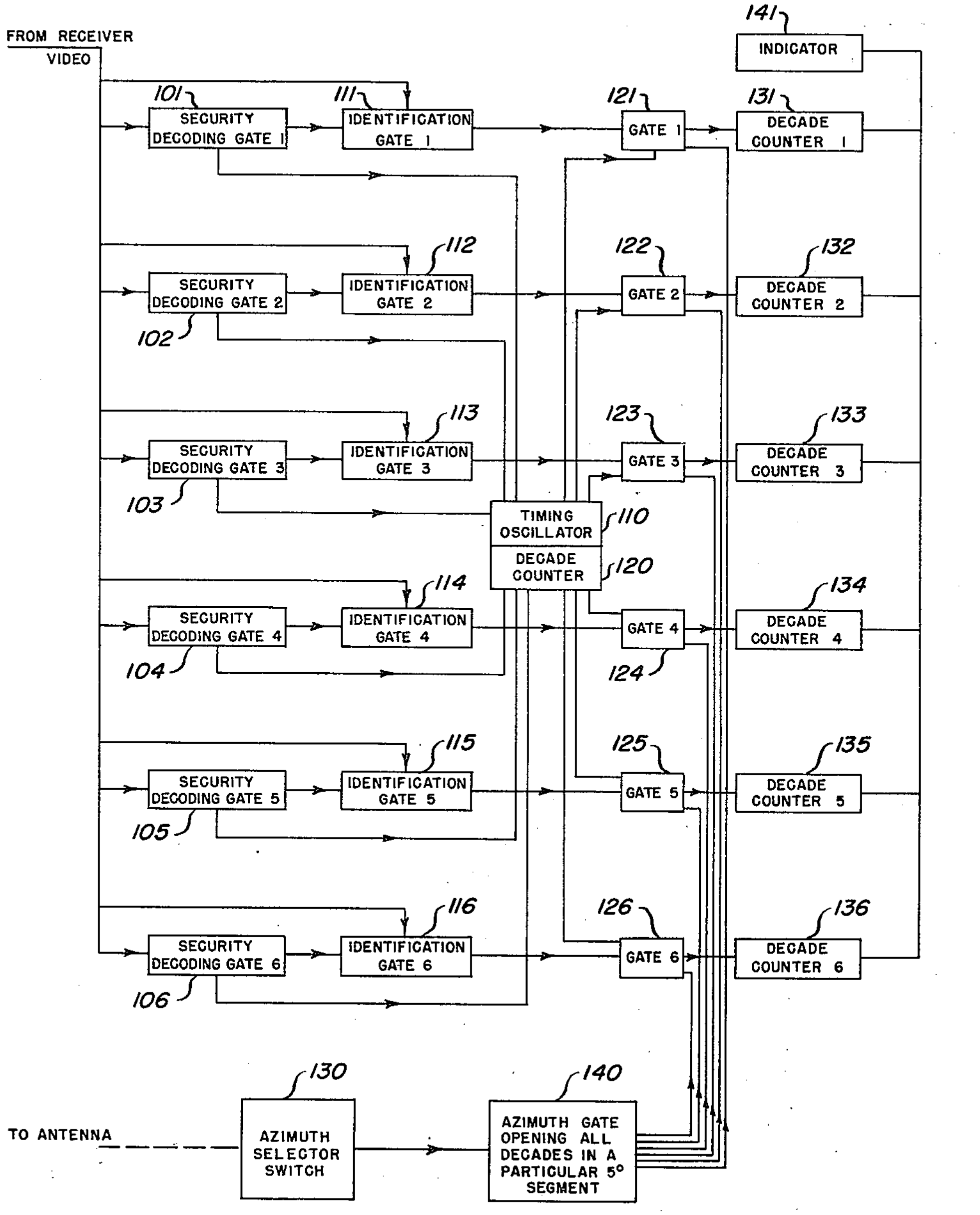
Fig. 3 is a block diagram of a portion of the ground receiving station according to our invention.

The high frequency energy pulses from the transmitting station are received at the ground station. After being demodulated by the receiver at the ground station, the video pulses are fed from the output of the receiver to the decoding and reproducing circuits shown in Fig. 3. The security coded marker pulses are then applied to the decoding gates 101—106. Each decoding gate may be similar to the decoder 12 in Fig. 2 and each decoding gate is adjusted to respond to only one set of marker pulses. For example, decoding gate 101 may respond to the marker pulses 1—1—1; security decoding gate 102 may respond to the marker pulses 1—2—1, etc. When the set of marker pulses 1—1—1 is applied to the decoding gate 101 the latter generates a pulse which is coincident with the trailing edge of the second marker pulse and starts the timing oscillator 110 and also pulses the identification signal gate 111. This opens the signal gate 111 in readiness for a signal pulse. The signal gate 111, as well as the corresponding gates 112—116, may consist of Eccles-Jordan flip-flop circuits. The signal gate 111 when opened by a pulse from the decoding gate 101, opens a gate 121 and permits the oscillations from the timing oscillator 110 to be fed through the gate 121 to a decade counter 131. Upon arrival of the signal pulse at the gate 111, it closes and sends a pulse to gate 121 which shuts off the latter and prevents further oscillations from reaching the decade counter 131. Thus, the counter 131 receives a number of cycles from the oscillator 110 corresponding to the time interval between the marker pulses and the signal pulse.

The oscillator 110 is also provided with a counter 120, which is preset to the number 10, so that after it receives 10 oscillations from the oscillator 110, it resets itself and simultaneously feeds its output pulse to the oscillator and shuts it off. Thereafter the oscillator awaits a second pulse to start it again, which second pulse it may receive from the decoding gate 102, in response to the arrival of the marker code 1—2—1. Any suitable type of indicator 141 may be connected to the counter 131 for indicating or recording the number counted by the counter 131. The indicator may be an integral part of the counter 131, as it is in the case of the RCA counter mentioned above. In this manner, all six numbers which we have presumed to be sent by the transmitting equipment in Fig. 2, will be received and properly distributed among the six channels and the signal characters or numbers will be presented in their right order on the indicator 141.

While we have described a simple form of our system in order to make the principles of our invention more manifest, it will be appreciated that it is susceptible to considerable elaboration. Instead of providing only ten microsecond intervals for the signal pulses the intervals may be made long enough to accommodate letters, numerals and other useful signal characters. The messages may be put on the counters 61—66 by presetting the counters by any known means such as a perforated tape or a keyboard. At the receiving station the message may be presented or recorded by any of the several means common in the art.

The decade counters 131—136 and indicator 141 may be duplicated for each five degree azimuth sector. The counters and indicators of a given five degree sector will be switched on when the antenna 1 is pointed in that sector. The azimuth selector circuit 8 for giving this azimuth indication of the airplane consists of a azimuth selector circuit 8, Fig. 1, consisting of a selector switch 130 and an azimuth gate 140. The selector switch rotates in synchronism with the antenna and through the gate 140 opens all decade counters 131—136 and the indicator 141 corresponding to the azimuthal position of the antenna.

It will be obvious that many variations of our system within the scope of our invention as defined by the claims will be apparent to those skilled in this art. We have endeavored to clearly present the principles of our invention in one preferred embodiment thereof without obscuring the invention by the elaboration of the details of the complex equipment. The invention is defined in the following claims.

What is claimed is:

1. An intelligence communication system comprising means for generating and transmitting from a single location a coded set of marker pulses and a signal pulse of electrical energy, the time interval between said marker pulses and said signal pulse representing said intelligence, means for receiving said marker pulses and said signal pulse, an oscillator, means for counting the number of cycles generated by said oscillator during the time interval between said marker pulses and said signal pulse, and means for reproducing said intelligence in response to the number of cycles counted by said means for counting.

2. An intelligence communication system comprising means for generating and transmitting from a single location a marker pulse and a signal pulse of electrical energy, the time interval between said pulses representing said intelligence, means for receiving said pulses, an oscillator, and means for reproducing said intelligence in response to the number of cycles generated by said oscillator during the time interval between reception of said marker and signal pulses.

3. An intelligence communicating system comprising means for generating and transmitting from a single location marker pulses and signal pulses of electrical energy, means for spacing the signal pulses by discrete time intervals from their immediately preceding marker pulses, each discrete time interval corresponding to a signal character, means for receiving said pulses, an oscillator, and means for reproducing a signal character representative of said intelligence in response to the number of cycles generated by said oscillator during the time interval between reception of a marker and a signal pulse by said means for receiving said pulses.

4. A system for transmitting messages utilizing a number of distinct signal characters such as numerical or alphabetical letters, comprising means for generating and transmitting sets of marker pulses and signal pulses of electrical energy, means for spacing the sets of marker pulses by an interval containing an integral number of time units greater than the number of signal characters, means for spacing the signal pulses by discrete time intervals from their immediately preceding sets of marker pulses, the duration of each discrete time interval corresponding to a signal character, means for receiving said pulses including an oscillator, and means for reproducing a signal character in response to the number of cycles generated by said oscillator during the time interval between a marker and a signal pulse.

5. A communication system comprising means for generating and transmitting from a single location marker pulses and signal pulses of electrical energy, means for spacing the signal pulses by discrete time intervals from their immediately preceding marker pulses, each discrete time interval corresponding to a signal character, means for receiving said pulses including an oscillator, a gate circuit connected to the output of said oscillator, means for opening said gate circuit in response to a marker pulse and closing said gate circuit in response to a signal pulse, means connected to said gate circuit for reproducing a signal character in response to the number of cycles of said oscillator transmitted through said gate circuit to said last named means.

6. The system set forth in claim 5 including means for starting the oscillator in response to a marker pulse and means for stopping the oscillator after it generates a predetermined number of cycles.

7. A communication system comprising means for generating and transmitting from a single location a marker pulse and a signal pulse of electrical energy, the time intervals between each marker pulse and the following signal pulses including an integral number of time units, each different integral number of time units corresponding to a different intelligence bearing signal character, means for receiving said pulses including an oscillator whose frequency is such that each cycle has a duration substantially equal to one of said time units, means for counting the number of cycles generated by said oscillator during each of said time intervals, and means for reproducing an intelligence bearing signal character in response to the number of counted cycles.

8. A communication system comprising a single transmitting station including means for generating a sequence of variously coded sets of pulses, means at said transmitting station for generating signal pulses so that each signal pulse follows a coded set of pulses by a time interval determined by the signal character to be transmitted, means for converting said coded and signal pulses to corresponding pulses of high frequency energy and transmitting the same, a receiving station having means for receiving said high frequency energy, a plurality of signal circuit channels each selectively responsive to one group of coded pulses, and means in each of said channels for producing a signal character in response to a measurement of the time interval between its group of coded pulses and the succeeding signal pulse.

9. An aircraft interrogation system comprising a ground station and a repeater, means at the ground station for transmitting coded pulses of high frequency energy, said repeater having means for receiving and decoding said pulses, said repeater further comprising means for generating a sequence of groups of variously coded marker pulses in response to the received coded pulses, said repeater further comprising means for generating signal pulses so that each signal pulse follows a group of marker pulses by a time interval determined by the signal character to be transmitted, said repeater further comprising means for converting said marker and signal pulses to corresponding pulses of high frequency energy and transmitting the same; said ground station having means for receiving said high frequency energy from said repeater, said ground station having a plurality of signal channels each selectively responsive to one group of said marker pulses, and means in each of said channels for producing a signal character in response to the time interval between its group of marker pulses and the next signal pulse.

10. An aircraft interrogation system comprising a ground station and a repeater, means at the ground station for transmitting coded pulses of high frequency energy, said repeater having means for receiving and decoding said pulses, means for generating a sequence of substantially, each different from all the others, equally spaced groups of variously coded marker pulses in response to the received coded pulses, means for generating a signal pulse each following one of said groups of marker pulses by a number of time units determined by the signal character to be transmitted, means for converting said marker and signal pulses to corresponding pulses of high frequency energy and transmitting the same; said ground station having means for receiving said high frequency energy from said repeater, a plurality of signal channels each selectively responsive solely to one group of said marker pulses, and means in each of said channels for measuring the number of time units between the group of marker pulses to which it is solely selective and the next signal pulse and reproducing the transmitted signal character in response to the measured number of time units.

11. In a communication system in which signals are represented by the time intervals between pairs of pulses, a receiver comprising an oscillator, means responsive to the first pulse of each of said pairs for starting the oscillator, means responsive to the second pulse of each pair for stopping the oscillator, and means for reproducing said signals in response to a measurement of the number of cycles generated by said oscillator.

12. In a communication system in which intelligence bearing characters are represented by the time intervals between pairs of pulses, a receiver for said pulses including an oscillator, means for counting the number of oscillations generated during the time interval between each pair of pulses, and means for reproducing said characters in response to the number of oscillations counted.

13. The method of electrical communication of characters which consists of transmitting a set of coded marker pulses and a following signal pulse for each character, the coding of the marker pulses representing the position of a character in a message and the time interval between each set of marker pulses and a succeeding signal pulse representaing a character, receiving said pulses, reproducing each character in accordance with one of said time intervals, and arranging said reproduced characters in an order determined by the coding of the marker pulses.

14. A system for generating coded groups of pulses comprising an oscillator, a plurality of counters having preset counts, means for applying oscillations from said oscillator to said preset counters in sequence for counting of said oscillations, and means responsive to attainment of said preset counts by said counters for generating pulses of said coded groups of pulses.

15. A system for generating coded groups of marker and signal pulses in succession comprising, an oscillator, a plurality of pulse coders for generating each a predetermined arrangement of marker pulses, a plurality of counters having preset counts, means for applying oscillations from said oscillator to said preset counters in sequence for counting of said oscillations, means responsive to attainment of said preset counts by said counters for generating said signal pulses of said coded groups of pulses at time positions corresponding to said preset counts.

16. A system for generating coded marker pulses followed by signal pulses, comprising, means for generating a coded group of marker pulses, means for initiating a predetermined count at the end of a predetermined time interval measured from the first pulse of said coded group of marker pulses, means for generating a signal pulse in response to completion of said predetermined count, and means for transmitting said marker pulses and said signal pulse to a remote point.

17. A transmitter for generating coded marker pulse groups followed each by a signal pulse, comprising, first means for generating a first coded group of marker pulses, means for initiating a first predetermined count at the end of a predetermined first time interval measured from the first pulse of said first coded group of marker pulses, means for generating a first signal pulse in response to completion of said predetermined count, means for generating a second coded group of marker pulses, having coding distinguishable from the coding of said first group of marker pulses, at a time following said end of said predetermined first time interval, means for initiating a second predetermined count at the end of a predetermined second time interval measured from the first pulse of said second coded group of marker pulses, means for generating a second signal pulse in response to completion of said second predetermined count, and means for transmitting all said pulses.

18. The combination in accordance with claim 17, wherein is provided a stable oscillation source and at least a separate preset counter for counting oscillations deriving from said source, for performing each of said predetermined counts.

19. The combination in accordance with claim 18 wherein is further provided a receiver for said pulses, said receiver comprising at least a first channel and a second channel, a further stable oscillator of the same frequency as the first mentioned stable oscillator, and a separate receiver counter in each of said channels for counting oscillations deriving from said further stable oscillator, means responsive to said first groups of marker pulses for channeling said last mentioned oscillations into said first channel, means responsive to said second group of marker pulses for channeling said last mentioned oscillations into said second channel, and means responsive to said signal pulses for terminating respectively the counts of said receiver counters.

20. In combination, means for generating a first pulse, a counter preset to a predetermined count and capable of counting oscillations, a source of said oscillations, means responsive to said first pulse for initiating a count of said oscillations by said counter, means responsive to attainment of said predetermined count by said counter for generating a second pulse, and means for transmitting pulses.

References Cited in the file of this patent

UNITED STATES PATENTS

| | | |
|---|---|---|
| Re. 23,579 | Pierce | Nov. 11, 1952 |
| 2,082,697 | Ingerson | June 1, 1937 |
| 2,099,065 | Holden | Nov. 16, 1937 |
| 2,252,083 | Luck | Aug. 12, 1941 |
| 2,272,070 | Reeves | Feb. 3, 1942 |
| 2,282,092 | Roberts | May 5, 1942 |
| 2,373,134 | Massonneau | Apr. 10, 1945 |
| 2,381,920 | Miller | Aug. 14, 1945 |
| 2,400,574 | Rea et al. | May 21, 1946 |
| 2,403,561 | Smith | July 9, 1946 |
| 2,403,918 | Grosdorff | July 16, 1946 |
| 2,405,597 | Miller | Aug. 13, 1946 |
| 2,409,229 | Smith, Jr. et al. | Oct. 15, 1946 |
| 2,414,265 | Lawson | Jan. 14, 1947 |
| 2,417,717 | Tellier | Mar. 18, 1947 |
| 2,433,341 | Busignies | Dec. 30, 1947 |
| 2,433,385 | Miller | Dec. 30, 1947 |
| 2,437,707 | Pierce | Mar. 16, 1948 |
| 2,444,445 | Isbister | July 1, 1948 |
| 2,451,044 | Pierce | Oct. 12, 1948 |
| 2,451,859 | Mumma, et al. | Oct. 19, 1948 |
| 2,468,045 | Deloraine | Apr. 26, 1949 |
| 2,468,083 | Labin | Apr. 26, 1949 |
| 2,471,416 | Deloraine | May 31, 1949 |
| 2,478,919 | Hansell | Aug. 16, 1949 |
| 2,480,123 | Deloraine | Aug. 30, 1949 |
| 2,485,886 | Johnstone et al. | Oct. 25, 1949 |
| 2,531,412 | Deloraine | Nov. 28, 1950 |
| 2,537,056 | Hoeppner | Jan. 9, 1951 |
| 2,564,692 | Hoeppner | Aug. 21, 1951 |
| 2,589,808 | Hirsch | Mar. 18, 1952 |
| 2,592,777 | Williams | Apr. 15, 1952 |